United States Patent [19]
Sager

[11] Patent Number: 5,505,860
[45] Date of Patent: Apr. 9, 1996

[54] GREASE AND OIL TRAP

[76] Inventor: Robert J. Sager, 507 NW. 11th St., Mineral Wells, Tex. 76067

[21] Appl. No.: 327,611

[22] Filed: Oct. 24, 1994

[51] Int. Cl.$^6$ ..................................................... C02F 1/40
[52] U.S. Cl. ........................... 210/519; 210/521; 210/538
[58] Field of Search ..................................... 210/519, 521, 210/532.1, 532.2, 538, 540

[56] References Cited

U.S. PATENT DOCUMENTS

| | | | |
|---|---|---|---|
| 1,343,764 | 6/1920 | Clifford | 210/519 |
| 1,677,626 | 7/1928 | Frappy | 210/532.2 |
| 1,702,612 | 2/1929 | Morse | 210/519 |
| 2,393,498 | 1/1946 | Miller | 210/538 |
| 2,482,353 | 9/1949 | Loelkes | 210/532.2 |
| 2,624,463 | 1/1953 | Freese | 210/519 |
| 2,874,850 | 2/1959 | Untlanko | 210/519 |
| 3,527,348 | 9/1970 | Lalonde et al. | 210/540 |
| 3,971,719 | 7/1976 | Peters | 210/540 |
| 4,422,931 | 12/1983 | Wolde-Michael | 210/540 |

FOREIGN PATENT DOCUMENTS

| | | |
|---|---|---|
| 3535260 | 4/1987 | Germany . |
| 8902335 | 4/1991 | Netherlands . |

Primary Examiner—Christopher Upton

[57] ABSTRACT

A trap for separating and retaining grease, oil, and particulates from water or other fluids. The inventive device includes a trap body having an inlet fitting extending thereinto and terminating in a deflecting cup such that fluid entering the trap flows vertically upward from the cup. A planar baffle plate extending across an interior of the trap body retains grease on a first side thereof while permitting the water to flow under the planar baffle plate to a second side thereof. An angled baffle plate also extends across the interior of the trap body and includes an angled weir for deflecting food particles and the like from passage thereover. An outlet fitting extends from below the water to permit exiting of the filtered water from the trap body.

5 Claims, 3 Drawing Sheets

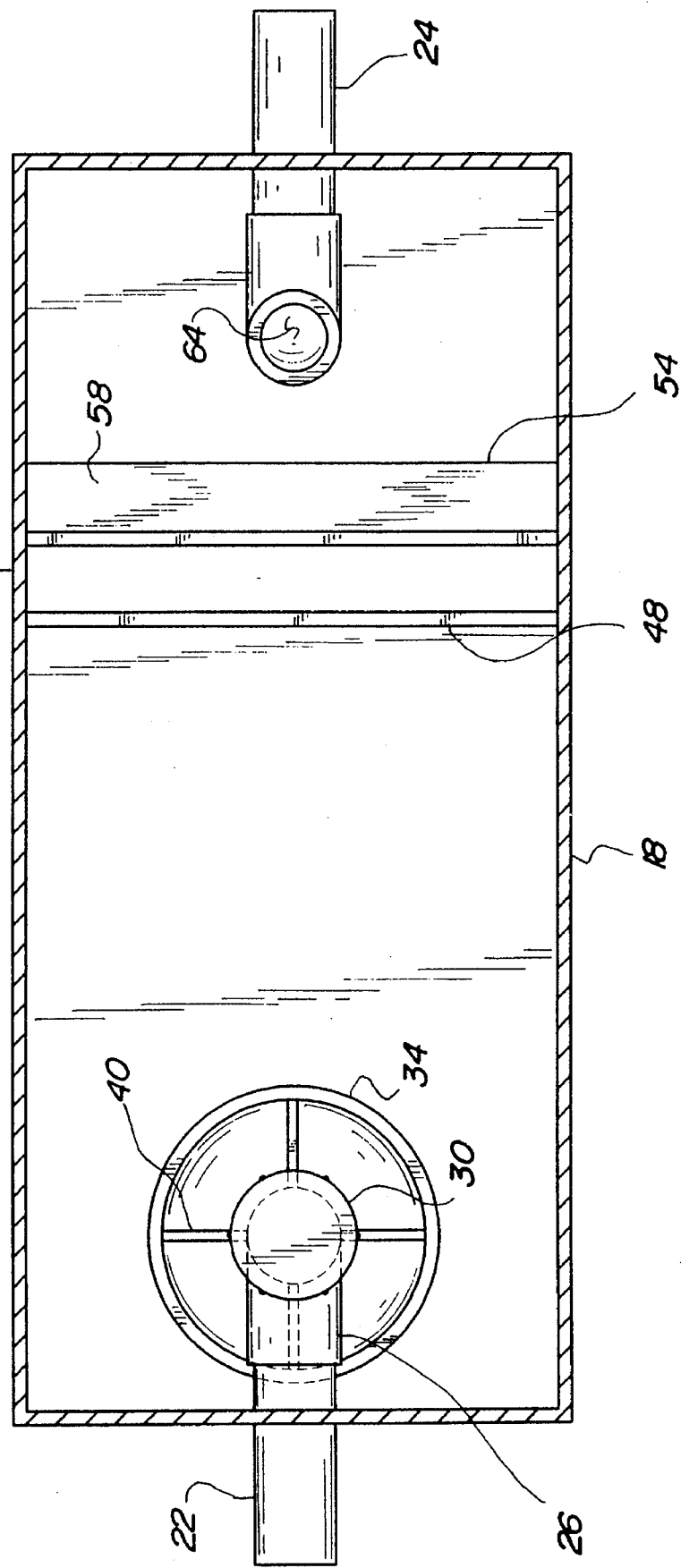

GREASE AND OIL TRAP

BACKGROUND OF THE INVENTION

1. Field of the Invention

The present invention relates to filtering devices and more particularly pertains to a grease and oil trap for separating and retaining grease, oil, and other particulates from water or other fluids.

2. Description of the Prior Art

The use of filtering devices is known in the prior art. More specifically, filtering devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art filtering devices include U.S. Pat. Nos. 3,847,814; 2,611,488; 5,122,280; 4,238,333; 3,962,098; 4,252,649; and 3,508,652.

while these devices fulfill their respective, particular objectives and requirements, the aforementioned patents do not disclose a grease and oil trap for separating and retaining grease and particulates from water or other fluids which includes a trap body having an inlet fitting extending thereinto and terminating in a deflecting cup, a planar baffle plate extending across an interior of the trap body for retaining grease and permitting water to flow thereunder, an angled baffle plate extending across the interior of the trap body and including an angled weir for precluding passage of particulates thereover, and an outlet fitting extending from below a water line within the trap body to permit exiting of the filtered water from the trap body.

In these respects, the grease and oil trap according to the present invention substantially departs from the conventional concepts and designs of the prior art, and in so doing provides an apparatus primarily developed for the purpose of separating and retaining grease, oil, and other particulates from water or other fluids.

SUMMARY OF THE INVENTION

In view of the foregoing disadvantages inherent in the known types of filtering devices now present in the prior art, the present invention provides a new grease and oil trap construction wherein the same can be utilized for separating and retaining grease, oil, and particulates from water. As such, the general purpose of the present invention, which will be described subsequently in greater detail, is to provide a new grease and oil trap apparatus and method which has many of the advantages of the filtering devices mentioned heretofore and many novel features that result in a grease and oil trap which is not anticipated, rendered obvious, suggested, or even implied by any of the prior art filtering devices, either alone or in any combination thereof.

To attain this, the present invention generally comprises a trap for separating and retaining grease, oil, and particulates from water or other fluids. The inventive device includes a trap body having an inlet fitting extending thereinto and terminating in a deflecting cup such that fluid entering the filter flows vertically upward from the cup. A planar baffle plate extending across an interior of the trap body retains grease on a first side thereof while permitting the water to flow under the planar baffle plate to a second side thereof. An angled baffle plate also extends across the interior of the trap body and includes an angled weir for deflecting food particles and the like from passage thereover. An outlet fitting extends from below the water to permit exiting of the filtered water from the trap body.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new grease and oil trap apparatus and method which has many of the advantages of the filtering devices mentioned heretofore and many novel features that result in a grease and oil trap which is not anticipated, rendered obvious, suggested, or even implied by any of the prior art filtering devices, either alone or in any combination thereof.

It is another object of the present invention to provide a new grease and oil trap which may be easily and efficiently manufactured and marketed.

It is a further object of the present invention to provide a new grease and oil trap which is of a durable and reliable construction.

An even further object of the present invention is to provide a new grease and oil trap which is susceptible of a low cost of manufacture with regard to both materials and labor, and which accordingly is then susceptible of low prices of sale to the consuming public, thereby making such grease and oil traps economically available to the buying public.

Still yet another object of the present invention is to provide a new grease and oil trap which provides in the apparatuses and methods of the prior art some of the advantages thereof, while simultaneously overcoming some of the disadvantages normally associated therewith.

Still another object of the present invention is to provide a new grease and oil trap for separating and retaining grease, oil, and other particulates from water or other fluids.

Yet another object of the present invention is to provide a new grease and oil trap which includes a trap body having an inlet fitting extending thereinto and terminating in a deflecting cup, a planar baffle plate extending across an interior of the trap body for retaining grease and permitting water to flow thereunder, an angled baffle plate extending across the interior of the trap body and including an angled weir for precluding passage of particulates thereover, and an outlet fitting extending from below a water line within the trap body to permit exiting of the filtered water from the trap body.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the inventions.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a cross-sectional view taken from line 4—4 of FIG. 3.

DESCRIPTION OF THE PREFERRED EMBODIMENT

Figure 1:
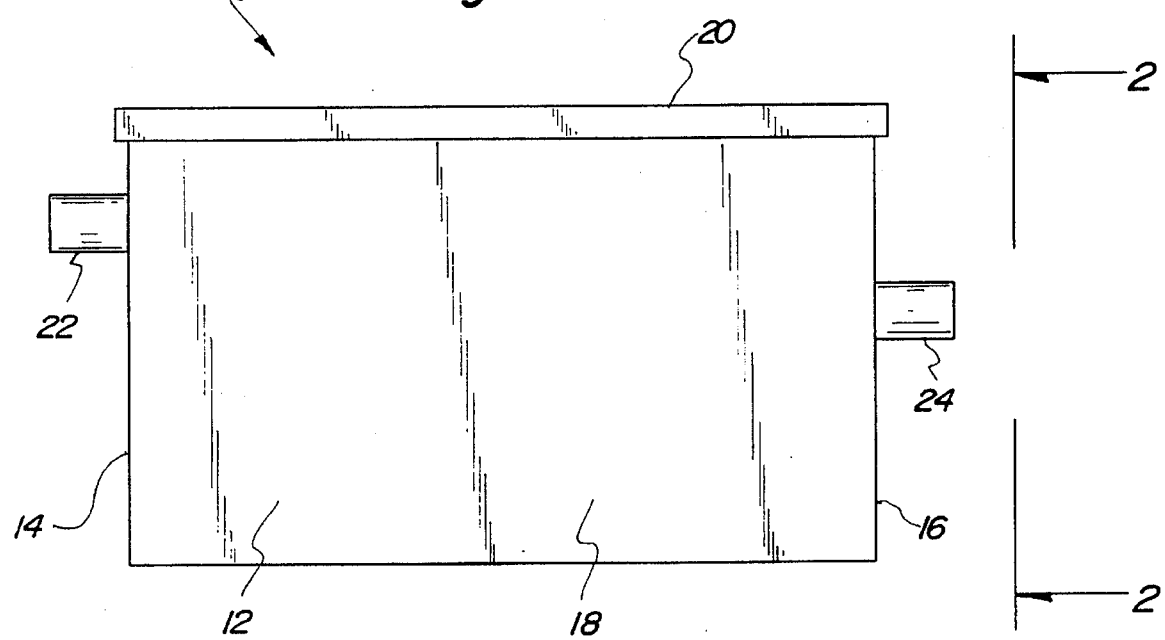
FIG. 1 is a side elevation view of a grease and oil trap according to the present invention.
Figure 2:
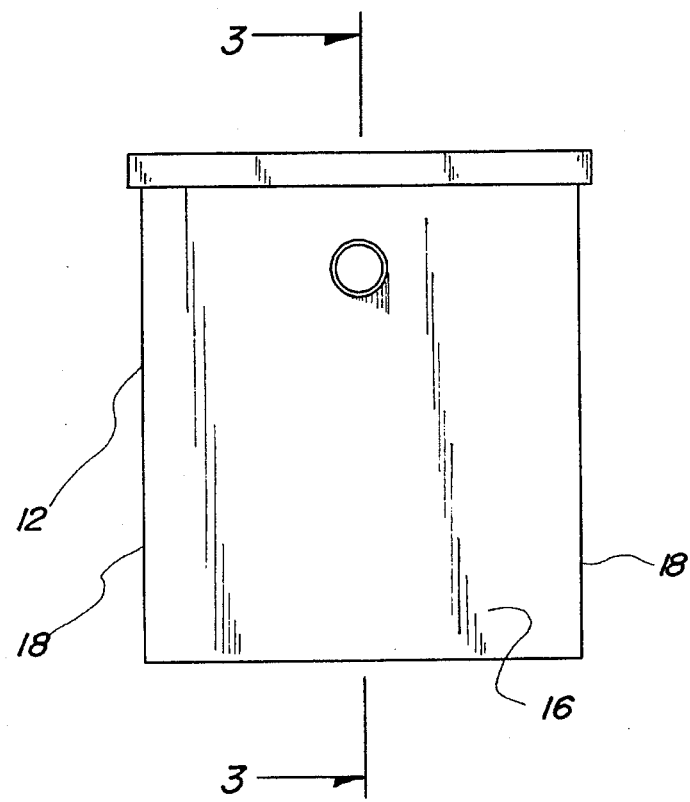
FIG. 2 is a front elevation view thereof.

With reference now to the drawings, and in particular to FIGS. 1–4 thereof, a new grease and oil trap embodying the principles and concepts of the present invention and generally designated by the reference numeral 10 will be described.

More specifically, it will be noted that the grease and oil trap 10 comprises a trap body 12 having a front wall 14 spaced from a rear wall 16, with a pair of parallel side walls 18 extending substantially orthogonally between the front and rear walls. The trap body 12 further includes an unlabelled bottom wall extending orthogonally between both the front and rear walls 14, 16 as well as the side walls 18 to define the substantially rectangular shape of the trap body 12. A removable cover 20 is coupled to a top end of the trap body 12 and secured thereto by frictional and/or interference fit. The removable cover 20 can be selectively removed from the filter body 12 to permit access into an interior of the trap body for cleaning and/or servicing of the grease and oil trap 10. An inlet fitting 22 is directed through the front wall 14 and extends into an interior of the trap body 12. Similarly, an outlet fitting 24 is directed through the rear wall 16 of the trap body 12 so as to permit communication into the interior thereof. The grease and oil trap 10 can thus be serially installed within a drain line or other fluid conduit to filter waste water or the like passing into the inlet fitting 22 and exiting through the outlet fitting 24 in a manner which will subsequently be described in more detail.

Figure 3:
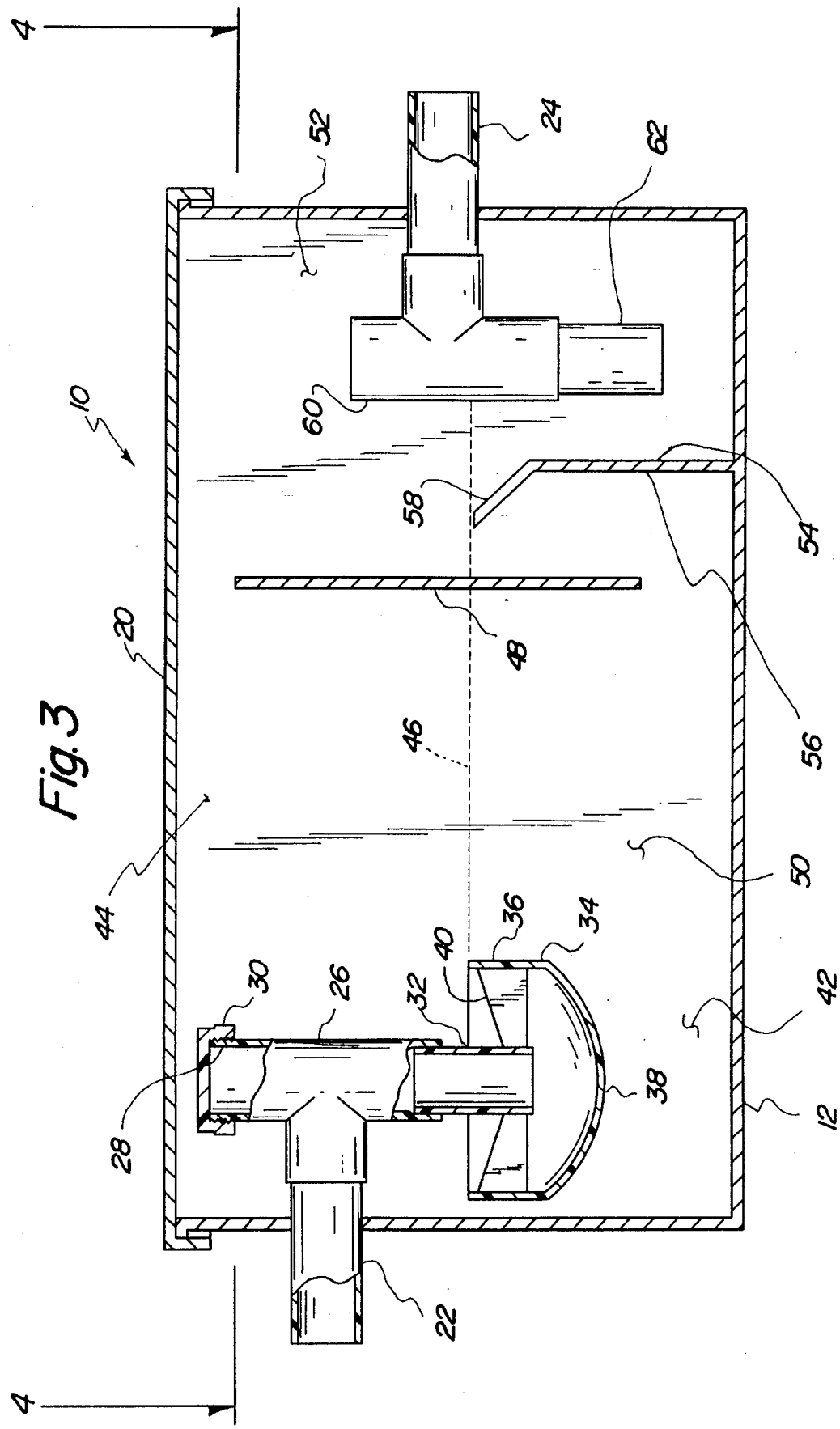
FIG. 3 is a cross-sectional view taken along line 3—3 of FIG. 2.

Referring now to FIGS. 3 and 4, it can be shown that the present invention 30 further includes an inlet T-connector 26 coupled to the inlet fitting 22 within the interior of the trap body 12. The inlet T-connector 26 is oriented so as to extend in a vertical orientation and includes a threaded upper end 28 having an access cap 30 threadably coupled thereto. The access cap 30 can be selectively removed during servicing of the device 10 should a portion of the inlet fitting 22 or the inlet T-connector 26 become clogged or otherwise impassible to fluid entering therethrough. The inlet T-connector 26 includes a second lower end having a center tube 32 projecting downwardly therefrom whereat an imperforate deflecting cup 34 is mounted. To this end, the deflecting cup 34 comprises a substantially cylindrical side wall 36 closed at a lower end thereof by a hemispherical dome 38. The cylindrical side wall 36 is open at an upper end thereof and mounted to the center tube 32 by a plurality of radial stanchions 40 extending from an exterior of the center tube 32 to mount with an interior of the cylindrical side wall 36 of the deflecting cup 34. By this structure, fluids directed into the device 10 will flow through the inlet fitting 22 and the center tube 32, whereby the deflecting cup 34 will capture and redirect such fluids into a vertically or upwardly projecting direction.

When the device 10 is treating water passing therethrough, the interior of the trap body 12 will be divided into a fluid region 42 separated from an air region 44 by a water line 46 extending horizontally within the trap body 12. Preferably, the open upper end of the cylindrical side wall 36 of the deflecting cup 34 is aligned with the water line 46. To this end, a lowermost portion of the outlet fitting 24, which serves to define the level or water line 46 of the fluid region 42 within the trap body 12 is positioned or aligned with the open upper end of the cylindrical side wall 36 of the deflecting cup 34, as shown in FIG. 3. Thus, as fluids including grease, oil, and particulates enter the device 10, they will be forced out the open upper end of the cylindrical side wall 36 of the deflecting cup 34 such that particulates residing in the fluid region 42 will not be agitated or "stirred up". Further, it is desirable that the cylindrical side wall 36 of the deflecting cup 34 have a first diameter, with the center tube 32 being of a second diameter, wherein the first diameter is substantially greater than the second diameter such that the contaminated fluid entering the device 10 is decelerated by such increase in diameter prior to exiting from the deflecting cup 34.

As the contaminated water or other fluid resides within the fluid region 42, particulates which are heavier than the water will sink to the interior surface of the bottom wall, while particulates lighter than water will float to the surface or water line 46 thereof. Further, grease and oil present within the effluent emission being treated will also float to the surface or water line 46 thereof. With continuing reference to FIG. 3, it can be shown that the present invention 10 further comprises a planar baffle plate 48 extending within the interior of the trap body 12 and being coupled to the interior surfaces of the opposed side walls 18. The planar baffle plate 48, however, is spaced from the interior surface of the bottom wall so as to permit water to pass thereunder. The planar baffle plate 48 separates the interior of the trap body 12 into a first compartment 50 and a second compartment 52. By this structure, grease and other floating particulates will be retained within the first compartment 50 of the trap body 12 and can be removed during servicing of the device 10 through a removal of the cover 20 and mechanical cleaning of the interior of the trap body.

The water and sunken particulates are permitted to pass beneath the planar baffle plate 48 and into the second compartment 52. To separate the sunken components from the fluid within the second compartment 52, a second baffle plate 54 extends upwardly from the interior surface of the bottom wall of the trap body 12 and is coupled to interior surfaces of both the side walls 18. The second baffle plate 54 includes a straight portion 56 having an upper edge to which an angled weir 58 projects. The angled weir 58 projects at an oblique angle relative to the straight portion 56 of the second baffle plate 54 towards the planar baffle plate 48 and serves to permit a passage of the water or fluid thereover while discouraging or redirecting the sunken particulates from passage thereover.

To permit exiting of the filtered water through the outlet fitting 24, an outlet T-connector 60 is coupled thereto within the interior of the trap body 12. To this end, a depending tube 62 projects from a lower end of the outlet T-connector 60 beneath the water line 46. An upper end of the outlet T-connector 60 is open as at 64 (see FIG. 4) to permit venting of the interior of the trap body 12. As a result of the depending tube 62 projecting below the water line 46, any grease or oil which may have somehow traversed the planar baffle plate 48 will be retained within the second compartment 52, thereby precluding a passage of such oil or grease through the outlet fitting 24.

In use, the present invention 10 can be easily installed within the drain line of a contaminated fluid discharge so as to filter and separate grease and oil and other particulates from the water passing therethrough. As described above, grease and oil will be retained within the fluid region 42 of the first compartment 50, with particulates heavier than water sinking to a bottom of the trap body 12. The purified water will then pass beneath the baffle plate 48 over the angled weir 58 to exit through the depending tube 62 and the outlet fitting 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A grease and oil trap comprising:

a trap body having a front wall spaced from a rear wall, a pair of side walls, a bottom wall, and a removable cover;

an inlet fitting directed through said trap body proximal to said front wall thereof, said inlet fitting extending into an interior of said trap body;

an outlet fitting directed through said trap body proximal to said rear wall thereof, said outlet fitting extending into said interior of said trap body;

a planar baffle plate extending across said interior of said trap body and being coupled to interior surfaces of said side walls, said planar baffle plate being spaced from an interior surface of said bottom wall so as to permit fluid to pass thereunder, said planar baffle plate separating said interior of said trap body into a first compartment and a second compartment;

a second baffle plate extending upwardly from said interior surface of said bottom wall of said trap body within said second compartment, said second baffle plate being coupled to interior surfaces of both said side walls, said second baffle plate including a straight portion having an upper edge and extending in a substantially spaced and parallel orientation relative to said planar baffle plate, and an angled weir coupled to said upper edge of said straight portion, said angled weir projecting from said straight portion at an oblique angle relative to said straight portion and towards said planar baffle plate, said angled weir portion projecting substantially upwardly from the straight portion and terminating in an angle weir upper edge positioned above said upper edge of said straight portion, said angled weir projecting towards both said removable cover of said trap body and said inlet fitting;

an inlet T-connector coupled to said inlet fitting within said interior of said trap body; a center tube projecting downwardly from a second lower end of said inlet T-connector; and an imperforate deflecting cup mounted to a lower end of said center tube for redirecting and decelerating fluid entering said trap body, said deflecting cup comprising a substantially cylindrical side wall closed at a lower end thereof by a hemispherical dome, said cylindrical side wall being open at an upper end thereof, said open upper end of said cylindrical side wall of said deflecting cup being aligned with a lowermost portion of said outlet fitting so as to define a water line within said trap body, said water line being aligned with the upper end of the cylindrical side wall and with both the angled weir upper edge and the lowermost portion of the outlet fitting.

2. The grease and oil trap of claim 1, wherein said inlet T-connector includes a threaded upper end having an access cap threadably coupled thereto.

3. The grease and oil trap of claim 2, wherein said deflecting cup further comprises a plurality of radially extending stanchions extending from an exterior of said center tube to mount with an interior of said cylindrical side wall of said deflecting cup to mount said deflecting cup relative to said center tube.

4. The grease and oil trap of claim 3, wherein said cylindrical side wall of said deflecting cup is of a first diameter, with said center tube being of a second diameter, wherein said first diameter is substantially greater than said second diameter such that said contaminated fluid entering said trap body is decelerated prior to exiting from said deflecting cup.

5. The grease and oil trap of claim 4, and further comprising an outlet T-connector coupled to said outlet fitting within said interior of said trap body; a depending tube projecting from a lower end of said outlet T-connector beneath said water line, with an upper end of said outlet T-connector being open to permit venting of said interior of said trap body.

* * * * *